W. G. GRIFFETH.
SAFETY LOCKING DEVICE AND ANTIRATTLER.
APPLICATION FILED MAR. 17, 1919. RENEWED APR. 29, 1920.
1,378,783.
Patented May 17, 1921.
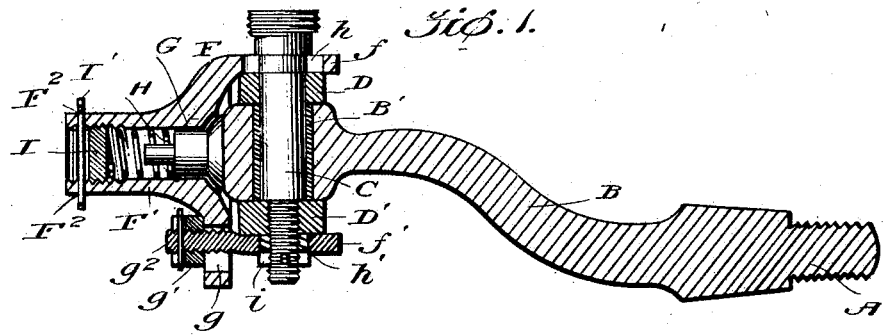
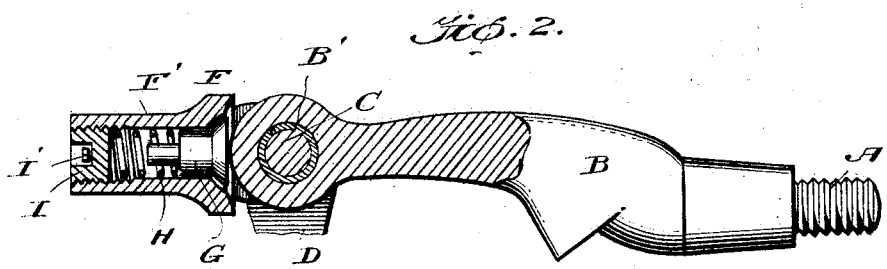
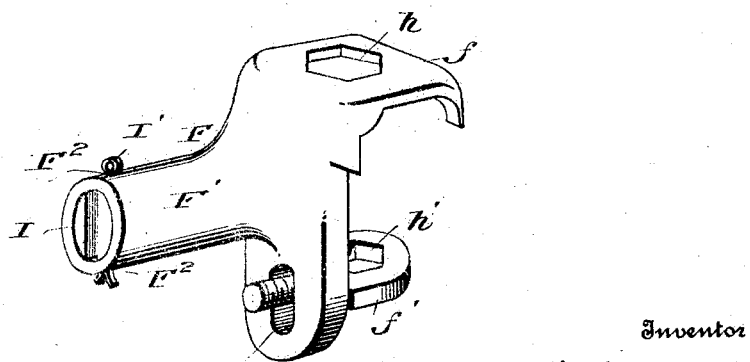

UNITED STATES PATENT OFFICE.

WILLIAM G. GRIFFETH, OF ATHENS, GEORGIA.

SAFETY LOCKING DEVICE AND ANTIRATTLER.

1,378,783. Specification of Letters Patent. Patented May 17, 1921.

Application filed March 17, 1919, Serial No. 283,182. Renewed April 29, 1920. Serial No. 377,689.

*To all whom it may concern:*

Be it known that I, WILLIAM G. GRIFFETH, a citizen of the United States, residing at Athens, in the county of Clarke and State of Georgia, have invented certain new and useful Improvements in Safety Locking Devices and Antirattlers; and I do hereby declare the following to be a full, clear, and exact description of the invention, such as will enable others skilled in the art to which it appertains to make and use the same.

The invention is a combined safety locking device and anti-rattler which is adapted to be attached to the steering arm on an automobile.

The object of the invention is to prevent the steering arm bolts from coming out, and at the same time prevent rattling of the parts.

The nature of the invention will be understood by reference to the accompanying drawing in which Figure 1 is a vertical sectional view taken through the steering arm and the attachment. Fig. 2 is a horizontal sectional view taken on the line 2—2 of Fig. 1, and Fig. 3 is a view of the attachment removed from the steering arm.

The steering arm B is provided at its rear end with a reduced screw threaded extension A, by means of which it is connected to the vertical sleeve of a stub axle or steering knuckle (not here shown) of a front wheel of an automobile, and secured by a nut in a well known manner. A pair of such arms, one on each side of a vehicle, is used, and they are connected at their outer ends by a transverse rod having at each end a forked or bifurcated portion composed of prongs D, D'. In or between the ends of the prongs D, D', Fig. 1, is connected the outer end of the steering arm B by means of a bolt C, passing through an eye B' in the arm.

These steering arm joints are subjected to constant up and down and transverse jars and jolts when the vehicle is in motion, so that they are liable to rattle and rapidly wear out, also to shake the bolt out of connection with its eye. In order to overcome this defect I provide the devices described below.

The safety locking device has a body portion F carrying an extension F' of tubular form. A follower G is inclosed within the tubular portion and is held in contact with the steering arm B by a spring H which thrusts against a plug I secured in position within the tubular portion by a cotter pin I' extending through a slot $I^2$ in the plug I and through holes $F^2$ in the tubular extension.

The safety locking device is also provided with ears $f$ and $f'$, the ear $f$ being integral therewith and the ear $f'$ being detachable. The ear $f'$ has a screw-threaded shank $f''$, which extends through a slot $g$ in the locking device. A nut $g'$ which is provided with a cotter pin $g^2$ to prevent it from turning, is screwed on to the protruding end of the ear. The ear $f'$ may be removed by releasing the nut $g'$ and tilting said ear in the slot $g$.

The ears $f$, $f'$ are respectively provided with holes $h$, $h'$ of angular formation through which the ends of the bolt C extend. The bolt is provided at its lower screw-threaded end with a nut $i$, which fits in the angular hole $h'$ of the ear $f'$ and the opposite end of the bolt fits the hole $h$ in the upper ear $f$, so that said bolt is prevented from turning. The nut $i$ is thus securely locked in position by the detachable ear $f'$, this ear in turn being prevented from tilting in the slot $g$ by the nut $g'$ which holds the ear $f'$ rigidly in position.

The parts of the device are readily assembled and manipulated, and may be relied upon to prevent the cross rod E and the steering arm B from becoming accidentally separated.

The spring pressed follower G takes up any lost motion in the parts thereby preventing rattling and consequent wear of the contacting surfaces. The pressure or tension of the spring H will be regulated by the screw plug I, so that when it has lost part of its tensile strength, the nut may be turned up against it to cause it to bear with sufficient pressure to prevent rattle and undue wear of the connected parts.

Having thus described my invention what I claim as new and desire to secure by Letters Patent is:

1. In combination with a joint, comprising the end of a steering arm, the end of a transverse connecting rod and an engaging bolt, of an antirattling and locking attachment, comprising a body portion having ears connecting with said bolt to hold it in place, and a tubular extension having in it a follower bearing on the end of said arm, and a tension spring bearing on the follower.

2. An anti-rattler attachment comprising a body portion having engaging ears, one of which is detachable and provided with an angular opening for engagement with the bolt of a steering arm, said ears being fitted to said bolt and to its nut to prevent said nut from turning relatively to said bolt.

3. An anti-rattler attachment for a steering arm joint comprising a body portion having an integral ear on one side and a slot on the other side, a detachable ear extending through said slot and provided with an angular opening for engaging a bolt and with locking means to hold it rigidly in position in said slot.

In testimony whereof, I affix my signature.

WILLIAM G. GRIFFETH.

Witnesses:
L. S. MAXWELL,
J. A. PITNER.